United States Patent
Sugano et al.

(10) Patent No.: US 10,059,340 B2
(45) Date of Patent: Aug. 28, 2018

(54) STARTING CONTROL DEVICE AND STARTING CONTROL METHOD

(71) Applicant: Nissan Motor Co., Ltd., Yokohama-shi, Kanagawa (JP)

(72) Inventors: Takeshi Sugano, Kanagawa (JP); Yasuhiko Takae, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/580,734

(22) PCT Filed: Jul. 14, 2015

(86) PCT No.: PCT/JP2015/070098
§ 371 (c)(1),
(2) Date: Dec. 8, 2017

(87) PCT Pub. No.: WO2017/009940
PCT Pub. Date: Jan. 19, 2017

(65) Prior Publication Data
US 2018/0141551 A1 May 24, 2018

(51) Int. Cl.
*B60T 7/12* (2006.01)
*B60W 30/17* (2012.01)
(Continued)

(52) U.S. Cl.
CPC ............. *B60W 30/17* (2013.01); *B60K 31/00* (2013.01); *B60W 30/14* (2013.01); *B60W 50/08* (2013.01);
(Continued)

(58) Field of Classification Search
CPC ........... B60W 20/18027; B60W 30/17; B60W 30/14; B60L 2250/26; B60L 15/2072; B60K 31/0008; B60K 31/00
(Continued)

(56) References Cited

U.S. PATENT DOCUMENTS 5,153,559 A * 10/1992 Atsumi ................. B60Q 9/008
180/167
5,969,969 A * 10/1999 Ejiri ....................... G01C 21/26
701/300
(Continued)

FOREIGN PATENT DOCUMENTS

DE 102005007568 A1 * 9/2005 ......... B60K 31/0008
DE 102005007568 B4 * 6/2011 ......... B60K 31/0008
(Continued)

OTHER PUBLICATIONS

Southeast Michigan 2014 Test Bed project architecture update: Developing, refining and implementing the USDOT's Connected Vehicle Reference Implementation Architecture; Walton Fehr et al., 2014 International Conference on Connected Vehicles and Expo (ICCVE); Year: 2014; pp. 16-23; IEEE Conferences.*
(Continued)

*Primary Examiner* — Cuong H Nguyen
(74) *Attorney, Agent, or Firm* — Global IP Counselors, LLP

(57) ABSTRACT

A starting control device is provided to detect a preceding vehicle that is stopped in front of a host vehicle, acquire a relative speed and an inter-vehicular distance between the preceding vehicle and the host vehicle, detect a starting request input by the driver of the host vehicle, and detects the number of times the starting request has been detected after the host vehicle has stopped. Then, the starting control device causes the host vehicle to start following a preceding vehicle when a standby period, which is the period from when the starting request is detected to when at least one of the relative speed and the inter-vehicular distance satisfies a preset start condition, is shorter than a start permission period that is set in advance.

6 Claims, 7 Drawing Sheets

(51) Int. Cl.
*B60K 31/00* (2006.01)
*B60W 30/14* (2006.01)
*B60W 50/08* (2012.01)
*B60W 50/00* (2006.01)
*B60W 50/14* (2012.01)

(52) U.S. Cl.
CPC ............... *B60W 2050/0014* (2013.01); *B60W 2050/0082* (2013.01); *B60W 2050/143* (2013.01); *B60W 2540/04* (2013.01); *B60W 2540/10* (2013.01); *B60W 2550/302* (2013.01); *B60W 2550/308* (2013.01); *B60W 2750/30* (2013.01)

(58) Field of Classification Search
USPC .............................................. 701/22, 93, 96
See application file for complete search history.

(56) References Cited

U.S. PATENT DOCUMENTS

| | | | | |
|---|---|---|---|---|
| 6,876,915 | B2* | 4/2005 | Kuramochi | B60K 31/0008 701/301 |
| 7,212,906 | B2* | 5/2007 | Arai | B60K 31/0008 340/903 |
| 7,477,979 | B2* | 1/2009 | Arai | B60K 31/0008 340/903 |
| 2005/0187697 | A1 | 8/2005 | Arai et al. | |
| 2005/0216168 | A1* | 9/2005 | Arai | B60K 31/0008 701/96 |
| 2011/0246043 | A1 | 10/2011 | Maruyama | |

FOREIGN PATENT DOCUMENTS

| | | | |
|---|---|---|---|
| JP | 2722656 B2 | 3/1998 | |
| JP | 2005247197 A * | 9/2005 | ......... B60K 31/0008 |
| JP | 2007-69729 A | 3/2007 | |
| JP | 4230385 A | 12/2008 | |
| JP | 2012-60768 A | 3/2012 | |
| JP | 2012-179936 A | 9/2012 | |
| JP | 2014-91349 A | 5/2014 | |

OTHER PUBLICATIONS

Southeast Michigan 2014 Test Bed project architecture: Implementing the USDOT's Connected Vehicle Reference Implementation Architecture; ; Dave McNamara; 2013 International Conference on Connected Vehicles and Expo (ICCVE); Year: 2013 pp. 71-75; IEEE Conferences.*

Experiments on platoon formation of heavy trucks in traffic; Kuo-Yun Liang et al.; 2016 IEEE 19th International Conference on Intelligent Transportation Systems (ITSC); Year: 2016; pp. 1813-1819; IEEE Conferences.*

Real time embedded system for accident prevention; ; Ancy John et al.; 2017 Inter. conf. of Electronics, Communication and Aerospace Technology (ICECA); Year: 2017, vol. 2; pp. 645-648; IEEE Conferences.*

* cited by examiner

STARTING CONTROL DEVICE AND STARTING CONTROL METHOD

CROSS-REFERENCE TO RELATED APPLICATIONS

This application is a U.S. National stage application of International Application No. PCT/JP2015/070098, filed Jul. 14, 2015.

BACKGROUND

Field of the Invention

The present invention relates to a starting control device and a starting control method for starting a host vehicle following a preceding vehicle that is stopped in front of the host vehicle.

Background Information

Patent Document 1 discloses a conventional following travel control device that sets a preceding vehicle for a host vehicle to follow and carries out a following travel control. In the following travel control device disclosed in Japanese Patent No. 4230385 (Patent Document 1), if a starting request by the driver is stored while the vehicle is stopped in a signal waiting state or on a congested road, a following travel control is initiated when a start of the preceding vehicle is detected. On the other hand, if a start of the preceding vehicle is not detected within a predetermined time after the starting request is stored, the stored starting request is erased.

SUMMARY

However, in the conventional following travel control device described above, the number of times that the driver made a starting request while the vehicle is stopped is not considered. Consequently, there is the problem that if the preceding vehicle does not start in a timely manner, it is necessary for the driver to make a starting request many times in order to resume following the preceding vehicle, which inconveniences the driver.

Therefore, in view of the circumstances described above, an object of the present invention is to provide a starting control device and a method thereof to prevent inconvenience to the driver, by taking into account the history of the driver's starting requests.

In order to achieve the object described above, the starting control device and method according to one embodiment of the present invention detects a preceding vehicle that is stopped in front of a host vehicle, acquires the relative speed and the inter-vehicular distance between the detected preceding vehicle and the host vehicle, and detects a starting request input by the driver of the host vehicle. Then, the number of times that a starting request has been detected after the host vehicle has stopped is detected, and a start permission period is set according to the detected number of times of starting requests. Thereafter, the host vehicle is permitted to start and follow the preceding vehicle when a standby period, which is the period from when the starting request is detected to when at least one of the relative speed and the inter-vehicular distance satisfies a preset start condition, is shorter than the start permission period. In addition, a start is suppressed when the standby period is greater than or equal to the start permission period.

According to the present invention, since a start permission period is set taking into consideration the number of times of starting requests, it is possible to reflect the intention of the driver to request a start, and to prevent inconvenience to the driver.

BRIEF DESCRIPTION OF THE DRAWINGS

Referring now to the drawings, a vehicle following control system is illustrated.

DETAILED DESCRIPTION OF THE EMBODIMENTS

The first to the third embodiments to which the present invention is applied are described below with reference to the drawings. In all the embodiments, the same components have been assigned the same numbers, and detailed descriptions thereof are omitted.

First Embodiment

Figure 1:
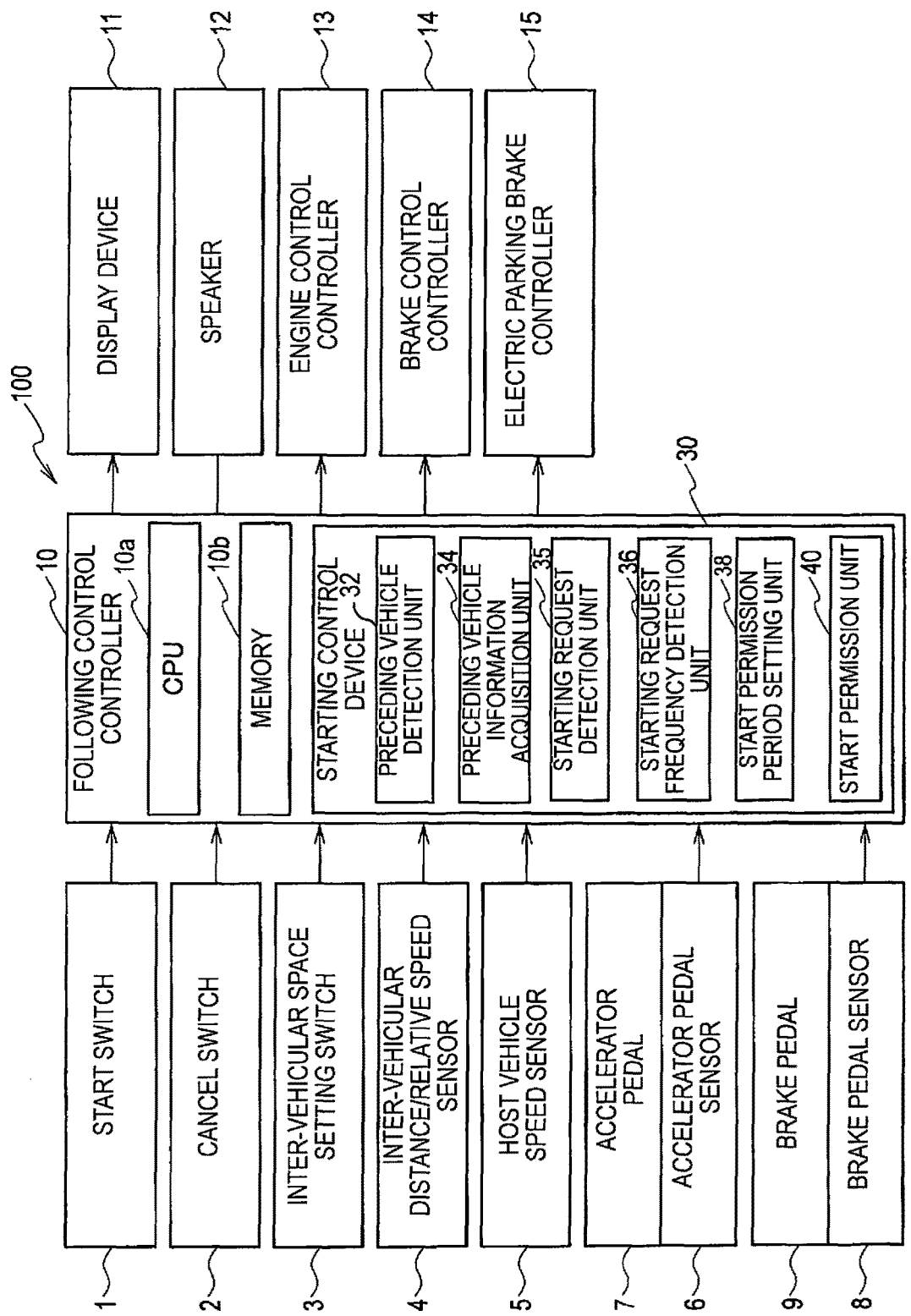
FIG. 1 is a block diagram illustrating the configuration of a following control system according to the first embodiment of the present invention.

FIG. 1 is a block diagram illustrating the configuration of a following control system equipped with the starting control device according to the present embodiment. The following control system 100 according to the present embodiment comprises a start switch 1, a cancel switch 2, an inter-vehicular space setting switch 3, an inter-vehicular distance/relative speed sensor 4, a host vehicle speed sensor 5, an accelerator pedal sensor 6, and a brake pedal sensor 8, as illustrated in FIG. 1. In addition, the following control system 100 comprises a following control controller 10, a display device 11, a speaker 12, an engine control controller 13, a brake control controller 14, and an electric parking brake controller 15. The following control controller 10 comprises a starting control device 30.

The following control system 100 comprises a low-speed following function and is mounted in a vehicle. In the present embodiment, if a preceding vehicle is detected in a host vehicle lane when the host vehicle speed is in the range of, for example, 40-100 km/h, an inter-vehicular space control is carried out such that an inter-vehicular time (=inter-vehicular distance/relative speed) to the preceding vehicle becomes a preset value for following the preceding vehicle. At this time, the preset vehicle speed (set vehicle speed) is set as the upper limit. On the other hand, if a preceding vehicle is not detected in the host vehicle lane, a vehicle speed control is carried out such that the vehicle travels at a constant speed at the set vehicle speed.

In addition, in the low-speed following function, if a preceding vehicle is detected in a host vehicle lane when the host vehicle speed is in the range of, for example, 0-40 km/h, an inter-vehicular distance control is carried out such that the inter-vehicular distance becomes an inter-vehicular distance corresponding to the host vehicle speed, with 40 km/h being the upper limit. Then, when a preceding vehicle is no longer detected, the inter-vehicular distance control is canceled. In addition, when the preceding vehicle stops, an electric parking brake is actuated after the host vehicle is stopped to carry out a stop holding control, and when the preceding vehicle starts and a predetermined automatic starting operation member is operated, an automatic starting control is carried out.

However, the preceding vehicle following control is not limited to the control described above. The preceding vehicle following control is not limited as long as a control is carried out at least from vehicle speed zero, a stop holding control is carried out after the host vehicle is stopped when the preceding vehicle stops, and an automatic starting control is carried out if the preceding vehicle starts when a predetermined automatic starting operation member is operated.

The start switch 1 is an automatic starting operation member that is operated in order to start an automatic starting control when the preceding vehicle starts while in a stop holding state. If the start switch 1 is operated during a stop holding control, the operation becomes a starting request by the driver. In the present embodiment, the presence/absence of a starting request, the number of times of starting requests, and the time from the previous starting request are detected based on an output signal from the start switch 1, and a starting request is set. This start switch 1 is installed in a center pad portion 19a of the steering wheel 19, as illustrated in FIG. 2.

Figure 2:
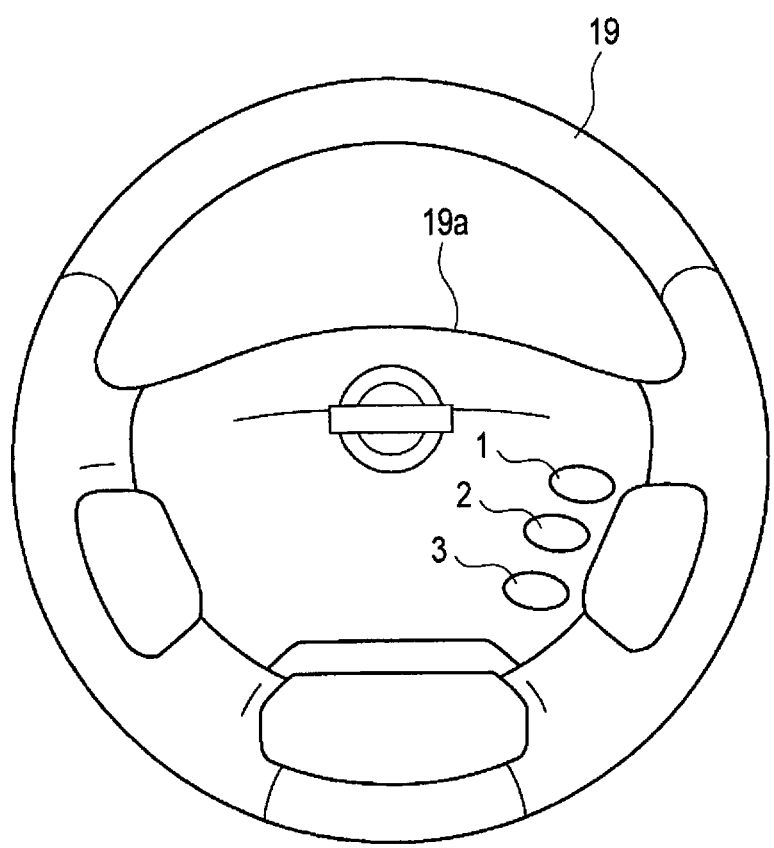
FIG. 2 shows the schematic arrangement of switches of the following control system according to the first embodiment of the present invention.

The cancel switch 2 is an operation member for canceling the automatic starting control and the preceding vehicle following control and is installed in the center pad portion 19a of the steering wheel 19, as illustrated in FIG. 2. The inter-vehicular space setting switch 3 is an operation member for setting a target inter-vehicular space (inter-vehicular time or inter-vehicular distance), and the target inter-vehicular space is toggled in the order of long, medium, and short, each time the switch is operated. This inter-vehicular space setting switch 3 is also installed in the center pad portion 19a of the steering wheel 19, as illustrated in FIG. 2.

The inter-vehicular distance/relative speed sensor 4 measures the inter-vehicular distance between the host vehicle and the preceding vehicle and calculates the relative speed by differentiating this measured value. Various sensors, such as a laser radar or a millimeter wave radar, can be used for the inter-vehicular distance/relative speed sensor 4. The host vehicle speed sensor 5 measures the travel speed of the host vehicle from the wheel speed.

The accelerator pedal sensor 6 outputs a signal corresponding to the depression amount (operation amount) of the accelerator pedal 7. The accelerator pedal 7 is an automatic starting operation member that is operated in order to start an automatic starting control when the preceding vehicle starts while in a stop holding state, in the same manner as the start switch 1 described above. If the accelerator pedal 7 is operated during a stop holding control, the operation becomes a starting request by the driver. In the present embodiment, the presence/absence of a starting request, the number of times of starting requests, and the time from the previous starting request are detected based on an output signal from the accelerator pedal sensor 6, and a starting request is set.

The brake pedal sensor 8 detects a depression of the brake pedal 9. When a depression of the brake pedal 9 is detected, the automatic starting control and the preceding vehicle following control are canceled.

Figure 3:
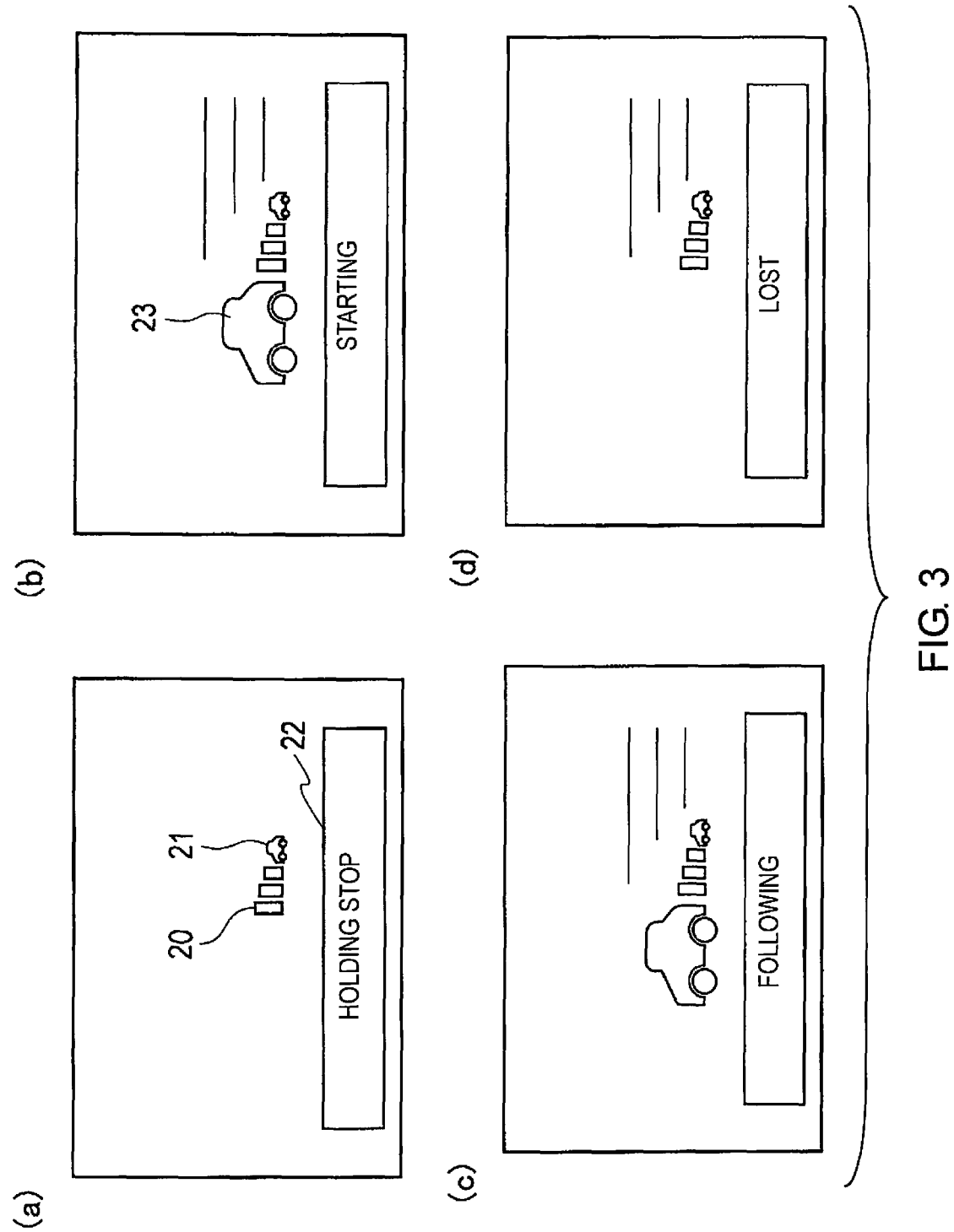
FIG. 3 is a view illustrating one example of a display by the following control system according to the first embodiment of the present invention.

The display device 11 is installed in the instrument panel and displays the states of the automatic starting control and the preceding vehicle following control, as well as the state of the inter-vehicular space setting, as illustrated in FIG. 3. FIG. 3(a) is a display example during a stop hold. Reference symbol 20 in FIG. 3(a) indicates the inter-vehicular space setting state; one bar indicates "short," two bars indicate "medium," and three bars indicate "long." Reference symbol 21 is a host vehicle mark. Reference symbol 22 is a control state display window, which displays messages indicating the stop holding state and the preceding vehicle following control state. FIG. 3(b) is a display example during a starting control. Reference symbol 23 is a preceding vehicle mark to be displayed during an automatic starting control and during a preceding vehicle following control. FIG. 3(c) is a display example during a preceding vehicle following control, and FIG. 3(d) is a display example immediately after the preceding vehicle has been lost.

The speaker 12 outputs voice representing various control states, and outputs an alarm when necessary. For example, a voice guidance "holding stop" is given when starting a stop holding control, "starting" is given when starting a starting control, and "preceding vehicle lost" is given when the preceding vehicle has been lost. In addition, when the driver operates one of the start switch 1, the cancel switch 2, and the inter-vehicular space setting switch 3, a beep sound confirming the operation is sounded.

The engine control controller 13 controls the engine output according to an acceleration command from the following control controller 10, and the brake control controller 14 controls the deceleration force of the engine brake and the hydraulic brake according to a deceleration command from the following control controller 10. The electric parking brake controller 15 actuates the electric parking brake according to a stop holding command from the following control controller 10.

The following control controller 10 comprises a CPU 10a, a memory 10b, and the like, and carries out stop holding control, automatic starting control, preceding vehicle following control, display control, and the like based on operation signals from switches 1-3 and detection signals from the various sensors 4-6, and 8. In addition, the following control controller 10 controls the display device 11, the speaker 12, the engine control controller 13, the brake control controller 14, and the electric parking brake controller 15. The memory 10b stores the operation record and the number of times of starting requests of the start switch 1 and the accelerator pedal 7, which are automatic starting operation members, the acceleration command values and the duration of the acceleration command, which are the result of various control calculations, and the like. Then, the following control controller 10 comprises a starting control device 30.

The starting control device 30 is used to carry out a control to start the host vehicle that follows a preceding vehicle that is stopped in front of the host vehicle and comprises a preceding vehicle detection unit 32, a preceding vehicle information acquisition unit 34, a starting request detection unit 35, a starting request frequency detection unit 36, a start permission period setting unit 38, and a start permission unit 40.

The preceding vehicle detection unit 32 detects a preceding vehicle traveling in front of the host vehicle and a preceding vehicle stopped in front of the host vehicle by executing the preceding vehicle following control provided to the host vehicle.

The preceding vehicle information acquisition unit 34 acquires information relating to the preceding vehicle detected by the preceding vehicle detection unit 32 as preceding vehicle information. Specifically, the preceding vehicle information acquisition unit 34 acquires the inter-vehicular distance and the relative speed between the preceding vehicle and the host vehicle from the inter-vehicular distance/relative speed sensor 4 and stores the same in the memory 10*b*.

The starting request detection unit 35 detects a starting request that is input by the driver of the host vehicle during a stop control of the host vehicle. Specifically, when the start switch 1, which is an automatic starting operation member, is operated, the starting request detection unit 35 detects the presence/absence of a starting request, the number of times of starting requests, and the time from the previous starting request, based on an output signal of the start switch 1. Similarly, when the accelerator pedal 7, which is an automatic starting operation member, is operated, the starting request detection unit 35 detects the presence/absence of a starting request, the number of times of starting requests, and the time from the previous starting request, based on an output signal from the accelerator pedal sensor 6. Additionally, the starting request detection unit 35 outputs a starting request detection signal when acquiring a starting request.

The starting request frequency detection unit 36 detects the number of times a starting request has been detected after the host vehicle is stopped. Specifically, the starting request frequency detection unit 36 accesses the memory 10*b* and acquires the starting requests that have been detected from when the host vehicle is stopped to the present, to detect the number of times thereof.

In addition, the starting request detection unit 35 outputs a starting request detection signal when acquiring a starting request, and the start permission period setting unit 38, described below, outputs a start suppression signal for suppressing a starting of the host vehicle when a start permission period has elapsed. Therefore, if a start suppression signal is not being output and only a starting request detection signal is being output, the starting request frequency detection unit 36 determines that it is the first starting request. On the other hand, if both a starting request detection signal and a start suppression signal are being output, it is determined to be the second or subsequent starting request.

The start permission period setting unit 38 sets a start permission period from when a starting request is input until the starting of the host vehicle is suppressed, in accordance with the number of times of starting requests detected by the starting request frequency detection unit 36. In the present embodiment, the start permission period is changed depending on whether it is the first starting request or a second or subsequent starting request. In addition, the start permission period setting unit 38 outputs a start suppression signal for suppressing the starting of the host vehicle when a start permission period has elapsed and stops the start suppression signal when the next starting request is input.

The start permission unit 40 calculates the length of the standby period, which is the period from when a starting request is detected until at least one of the inter-vehicular distance and the relative speed, acquired by the preceding vehicle information acquisition unit 34, satisfies a preset start condition. Then, the host vehicle is permitted to start following the preceding vehicle if this standby period is shorter than the length of the start permission period, which is a preset period, and starting is suppressed if the standby period is greater than or equal to the start permission period. Additionally, the start permission unit 40 may allow the host vehicle to start following the preceding vehicle, if at least one of the inter-vehicular distance and the relative speed, acquired by the preceding vehicle information acquisition unit 34, satisfies a preset start condition, within the start permission period set by the start permission period setting unit 38.

The starting control device 30 is configured from a general-purpose electronic circuit that includes a microcomputer, a microprocessor, and a CPU, and peripheral devices such as a memory. Then, by executing a specific program, the starting control device operates as the preceding vehicle detection unit 32, the preceding vehicle information acquisition unit 34, the starting request detection unit 35, the starting request frequency detection unit 36, the start permission period setting unit 38, and the start permission unit 40 described above.

Figure 4:
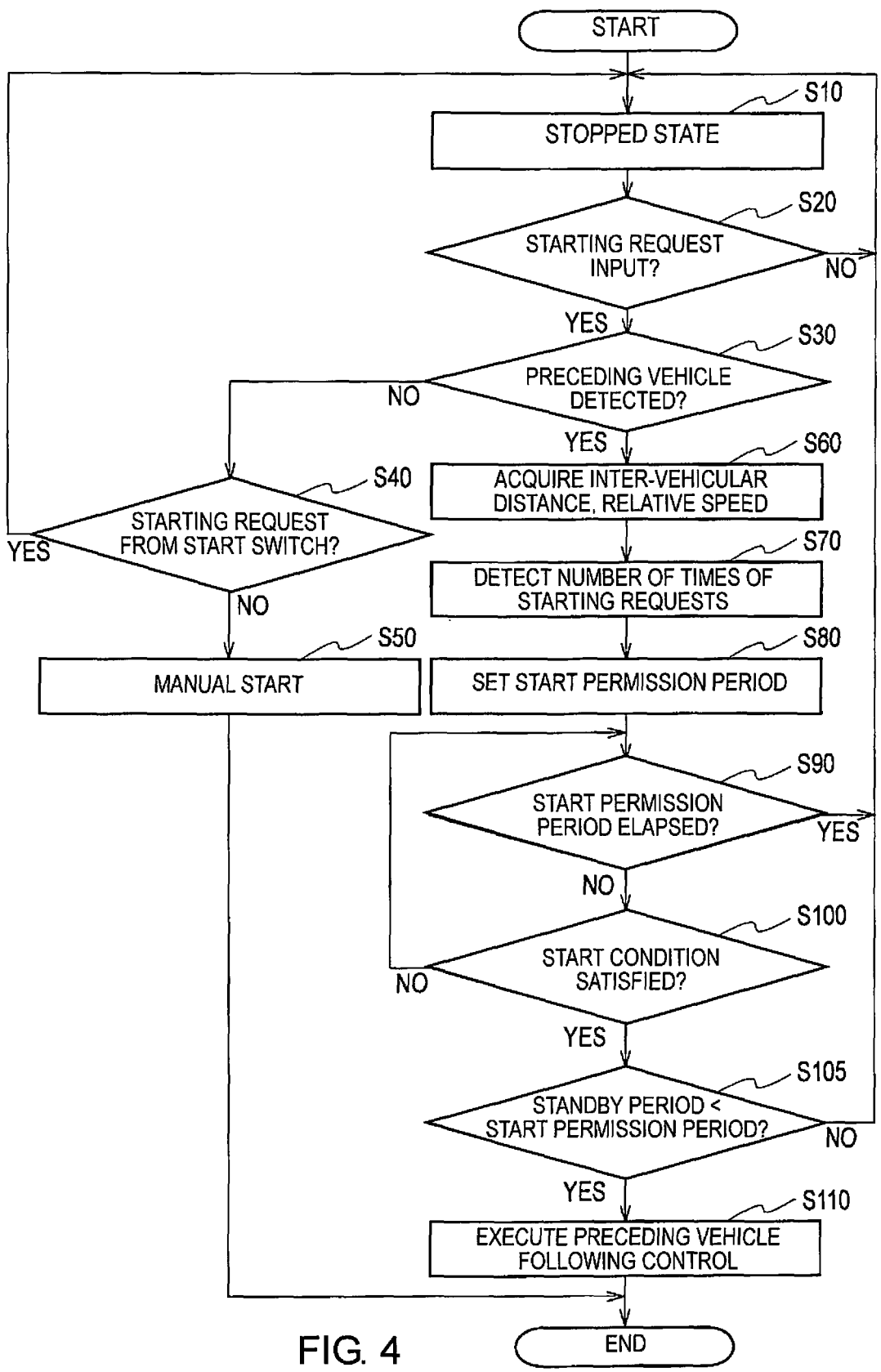
FIG. 4 is a flowchart illustrating the processing procedure of a starting control process by the starting control device according to the first embodiment of the present invention.

Next, the procedure of the starting control process by the starting control device 30 according to the present embodiment will be described with reference to the flowchart of FIG. 4. In FIG. 4, an operation from the stop holding control state will be described.

Figure 5:
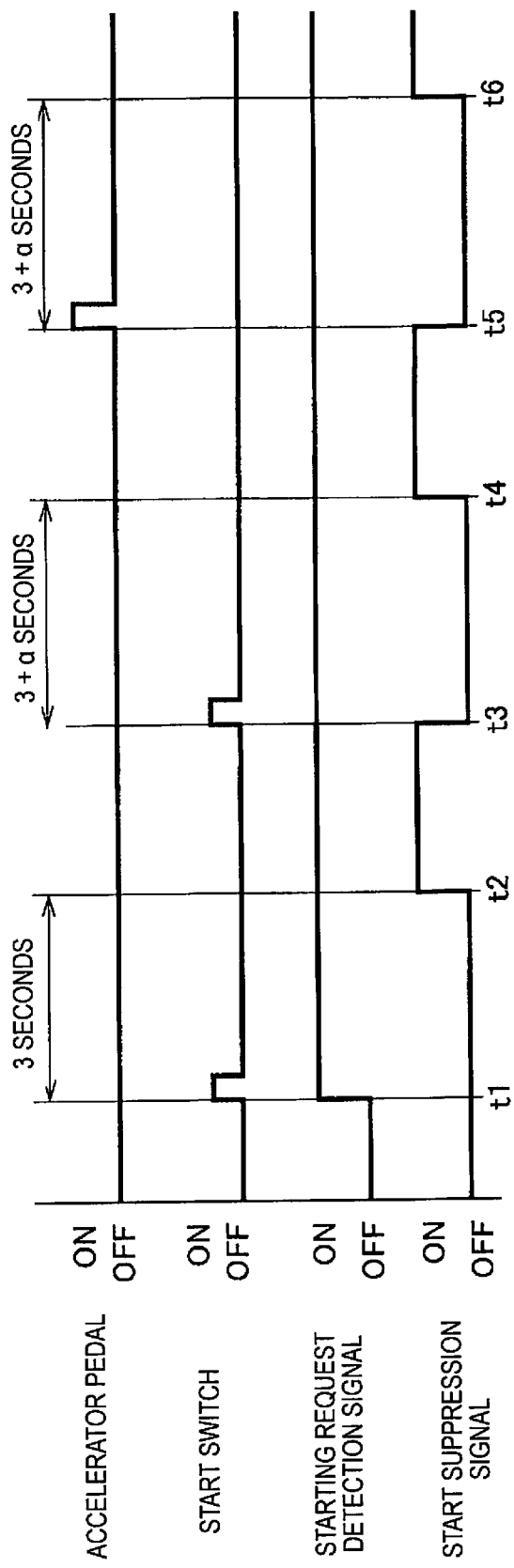
FIG. 5 is a view for explaining the method of setting the start permission period by the starting control device according to the first embodiment of the present invention.

When the host vehicle enters a stop holding control state in Step S10, the starting request detection unit 35 determines whether or not a starting request, which becomes a starting initiator, has been input from the driver in Step S20, as illustrated in FIG. 4. A starting request is input by the driver operating the start switch 1 or the accelerator pedal 7, which are automatic starting operation members. If a starting request has not been input, the process returns to Step S10 and the stop holding control state is maintained. On the other hand, if a starting request has been input, the starting request detection unit 35 acquires the starting request that has been input and outputs a starting request detection signal, and the process proceeds to Step S30. For example, if the start switch 1 is operated at time t1, the starting request detection unit 35 changes the starting request detection signal from OFF to ON, and outputs the same, as illustrated in FIG. 5. This starting request detection signal is continuously output until the host vehicle is started.

In Step S30, the preceding vehicle detection unit 32 searches for the presence of a preceding vehicle by actuating the inter-vehicular distance/relative speed sensor 4 and detects a preceding vehicle that is stopped in front of the host vehicle. At this time, if laser radar is used, in order to avoid laser light from being irradiated onto a pedestrian, the laser radar is stopped while the vehicle is stopped and is operated when confirming the presence of a preceding vehicle. Then, if a preceding vehicle could not be detected, the process proceeds to Step S40, and if a preceding vehicle could be detected, the process proceeds to Step S60.

In Step S40, the starting request detection unit 35 determines whether or not the starting request was input by an operation of the start switch 1. Here, if the starting request was input by an operation of the start switch 1, a warning "cannot start because there is no preceding vehicle" is issued by the display device 11 and the speaker 12, and the process returns to Step S10 to continue the stop holding control. On the other hand, if the starting request was input not by the start switch 1 but by an operation of the accelerator pedal 7, the process proceeds to Step S50.

In Step S50, the following control controller 10 determinations that the driver intends to start even if there is no preceding vehicle, cancels the stop holding control, manually starts the vehicle, and ends the starting control process according to the present embodiment.

In Step S60, the preceding vehicle information acquisition unit 34 acquires the inter-vehicular distance and the relative speed between the preceding vehicle and the host vehicle from the inter-vehicular distance/relative speed sensor 4 as preceding vehicle information.

In Step S70, the starting request frequency detection unit 36 detects the number of times of starting requests. In the present embodiment, the starting request frequency detection unit 36 uses the start suppression signal and the starting request detection signal, described below, and determines whether or not it is the first starting request, or a second or subsequent starting request.

For example, at time t1, only a starting request detection signal is output, and a start suppression signal is OFF and not output, as illustrated in FIG. 5; therefore, it is determined that the starting request at time t1 is the first starting request. In addition, at time t3, since both a starting request detection signal and a start suppression signal are being output, it is determined that the starting request at time t3 is a second or subsequent starting request.

The starting request detection signal is continuously output from when the first starting request is input until the host vehicle is started, as illustrated in FIG. 5. In addition, a start suppression signal is output when a start permission period has elapsed. Therefore, if both a starting request detection signal and a start suppression signal are being output when the starting request is input, it can be determined that it is a second or subsequent starting request.

In Step S80, the start permission period setting unit 38 sets a start permission period according to the number of times of starting requests detected in Step S70. The start permission period is the period from when a starting request is input until the starting of the host vehicle is suppressed. In the present embodiment, the start permission period is changed depending on whether it is the first starting request or a second or subsequent starting request. For example, if it is the first starting request, the start permission period (t1-t2) is set to 3 seconds, and if it is a second or subsequent starting request, the start permission period (t3-t4, etc.) is set to 3+α seconds, as illustrated in FIG. 5. Even when it is the third or fourth starting request, the start permission period is set to 3+α seconds, in the same manner as the second starting request. Since the intention of the driver to start the host vehicle is greater when inputting a second or subsequent starting request, compared to when inputting the first starting request, the start permission period is set longer for a second and later starting request to reflect said intention.

In Step S90, the start permission period setting unit 38 determines whether or not the start permission period set in Step S80 has elapsed. Then, for example, if the start permission period has not elapsed, such as during times t1-t2 in FIG. 5, the process proceeds to Step S100.

On the other hand, if the time is after time t2 in FIG. 5 and the start permission period has elapsed, the start permission period setting unit 38 outputs a start suppression signal for suppressing the starting of the host vehicle as a start prohibition flag, and the process returns to Step S10 to continue the stop holding control. The start suppression signal that has been output is stopped when the next starting request is input at time t3 in FIG. 5.

In addition, in the present embodiment, the host vehicle is suppressed from starting and following the preceding vehicle by outputting a start suppression signal; however, the starting of the host vehicle may be suppressed by stopping the starting request detection signal. For example, at time t2 in FIG. 5, the starting request detection signal may be stopped instead of outputting a start suppression signal.

In Step S100, the start permission unit 40 determines whether or not a start condition has been satisfied. Specifically, the start permission unit 40 determines whether or not at least one of the inter-vehicular distance and the relative speed, acquired in Step S60, satisfies a preset start condition. If the start condition is satisfied, the process proceeds to Step S110, and if the start condition is not satisfied, the process returns to Step S90 to determine whether or not the start permission period has elapsed.

In Step S105, the start permission unit 40 calculates the length of the standby period, which is the period from when a starting request is detected until the start condition is satisfied. Then, the host vehicle is permitted to start following the preceding vehicle if this standby period is shorter than the length of the start permission period, and the process proceeds to Step S110. On the other hand, a start is suppressed when the standby period is greater than or equal to the start permission period, and the process returns to Step S10.

In Step S110, the following control controller 10 executes a preceding vehicle following control to start the host vehicle following the preceding vehicle, and ends the starting control process according to the present embodiment.

As described above in detail, in the starting control device 30 according to the present embodiment, a start permission period is set according to the number of times of starting requests, and the host vehicle is permitted to start and follow the preceding vehicle when the standby period is shorter than the start permission period. In addition, a start is suppressed when the standby period is greater than or equal to the start permission period. Since a start permission period is thereby set taking into account the number of times of starting requests, it is possible to reflect the intention of the driver to request a start and to prevent inconvenience to the driver.

In addition, in the starting control device 30 according to the present embodiment, it is determined whether a starting request is the first starting request or a second or subsequent starting request, and the start permission period is changed depending on whether it is the first starting request or a second or subsequent starting request. Since it is thereby possible to set a start permission period specifically reflecting the intention of the driver to request a start, it is possible to prevent inconvenience to the driver.

Additionally, in the starting control device 30 according to the present embodiment, a starting request detection signal is output when a starting request is detected, and a start suppression signal is output when a start permission period has elapsed. Then, if only a starting request detection signal is being output, it is determined that the starting request is the first starting request, and if both a starting request detection signal and a start suppression signal are being output, it is determined to be the second or subsequent starting request. Since it is thereby possible specifically to determine whether a starting request is the first starting request, or a second or subsequent starting request, it is possible set a start permission period reflecting the intention of the driver to request a start and to prevent inconvenience to the driver.

Second Embodiment

Next, the starting control device according to the second embodiment of the present invention will be described with reference to the drawings. Since the configuration of the following control system according to the present embodiment is the same as in the first embodiment, a detailed description thereof is omitted. In the first embodiment, the start permission period is changed depending on whether it is the first starting request or a second or subsequent starting request; however, in the present embodiment, the start permission period is changed as the number of times of starting requests increases.

When the start switch 1 or the accelerator pedal 7, which are automatic starting operation members, is operated, the starting request detection unit 35 of the present embodiment detects a starting request and stores the same in the memory 10b. Then, the starting request frequency detection unit 36 accesses the memory 10b and counts how many times a starting request has been made including the current starting request to detect the number of times of starting requests. Then, the start permission period setting unit 38 changes the start permission period as the counted number of times of starting requests increases.

Figure 6:
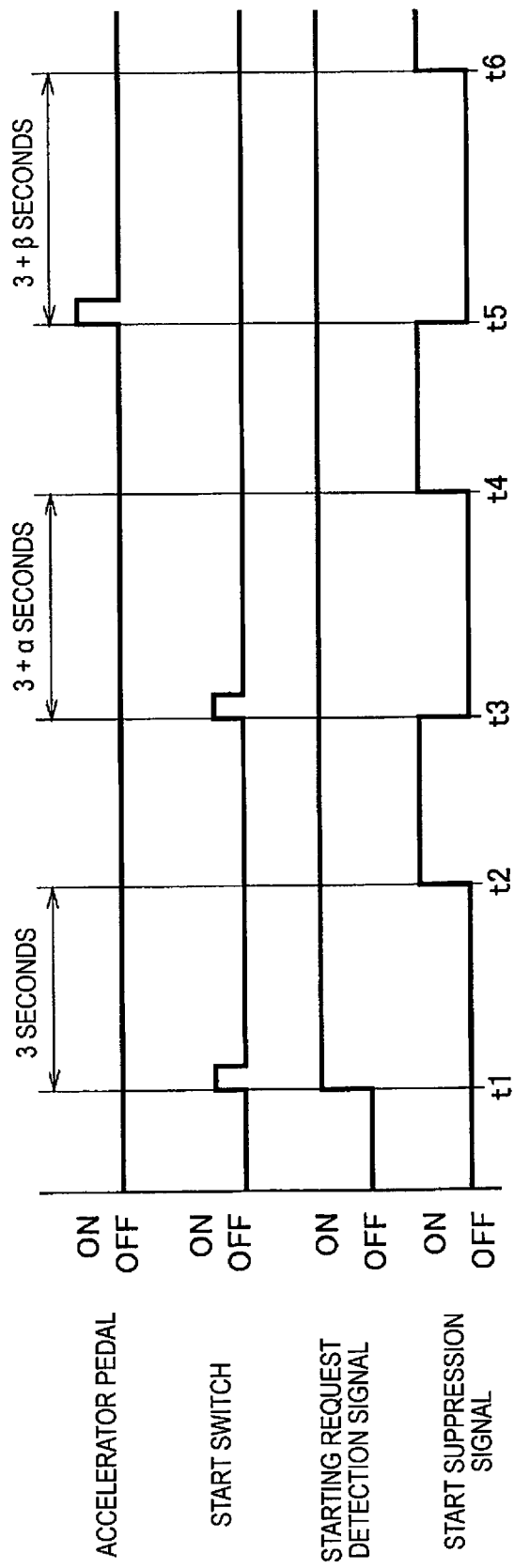
FIG. 6 is a view for explaining the method of setting the start permission period by the starting control device according to the second embodiment of the present invention.

For example, if it is the first starting request, the start permission period is set to 3 seconds, if it is the second starting request, the start permission period is set to 3+α seconds, and if it is the third starting request, the start permission period is set to 3+β seconds, as illustrated in FIG. 6. Thereafter, the start permission period is gradually increased as the number of times of starting requests increases. At this time, the start permission period may be set with, for example, 10 seconds being the upper limit. Since the intention of the driver to start the host vehicle can be considered to become greater as the number of times that a starting request is input increases, the start permission period is set to be longer as the number of times of starting requests increases to reflect said intention.

As described above in detail, in the starting control device 30 according to the present embodiment, the number of times of starting requests is counted, and the start permission period is changed as the counted number of times of starting requests increases. Since it is thereby possible to set a start permission period specifically reflecting the intention of the driver to request a start, it is possible to prevent inconvenience to the driver.

Third Embodiment

Next, the starting control device according to the third embodiment of the present invention will be described, with reference to the drawings. Since the configuration of the following control system according to the present embodiment is the same as in the first embodiment, a detailed description thereof is omitted. The present embodiment is different from the above-described embodiments in that the start permission period is changed according to the interval at which starting requests are input.

When the start switch 1 or the accelerator pedal 7, which are automatic starting operation members, is operated, the starting request detection unit 35 of the present embodiment detects a starting request, compares the starting request with the previous starting request stored in the memory 10b, and detects the interval between the previous starting request and the current starting request. Then, the start permission period setting unit 38 changes the start permission period according to the interval at which the starting requests are input.

Figure 7:
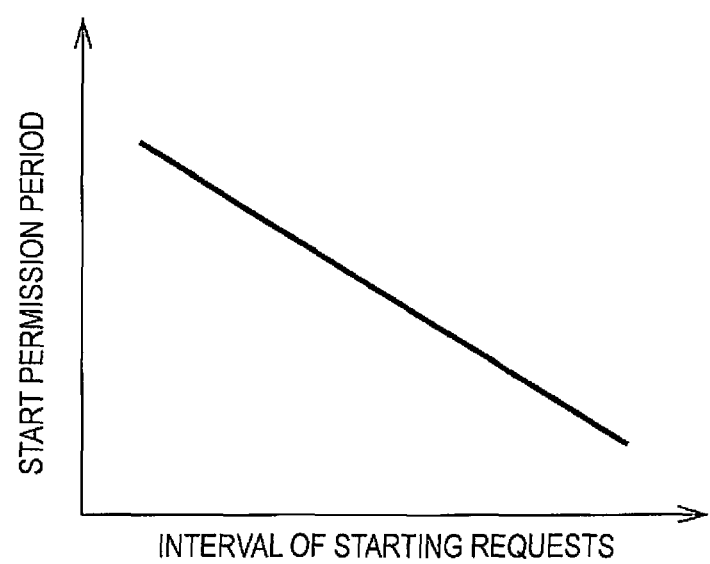
FIG. 7 is a view for explaining the method of setting the start permission period by the starting control device according to the third embodiment of the present invention.

For example, the start permission period is set to be short when the interval between the starting requests is long, and the start permission period is set to become longer as the interval between the starting requests becomes shorter, as illustrated in FIG. 7. Since the intention of the driver to start the host vehicle can be considered to be strong if the interval between starting requests is short, that is, when starting requests are being frequently input, the start permission period is set to be longer as the interval between the starting requests becomes shorter to reflect said intention.

As described above in detail, in the starting control device 30 according to the present embodiment, the interval at which the driver of the host vehicle inputs starting requests is detected, and the start permission period is changed according to the interval at which starting requests are input. Since it is thereby possible to set a start permission period specifically reflecting the intention of the driver to request a start, it is possible to prevent inconvenience to the driver.

The above-described embodiments are examples of the present invention. Accordingly, the present invention is not limited to the embodiments described above, and various modifications may be made in other forms besides those of the foregoing embodiments insofar as such changes are not outside the technical scope of the present invention.

The invention claimed is:

1. A starting control device for starting a host vehicle following a preceding vehicle that is stopped in front of the host vehicle, the starting control device comprising:
    a preceding vehicle detection unit that detects a preceding vehicle that is stopped in front of the host vehicle;
    a preceding vehicle information acquisition unit that acquires an inter-vehicular distance and a relative speed between the host vehicle and the preceding vehicle detected by the preceding vehicle detection unit;
    a starting request detection unit that detects a starting request that is input by a driver of the host vehicle;
    a controller that causes the host vehicle to start following a preceding vehicle when a standby period, which is a period from when the starting request is detected to when at least one of the relative speed and the inter-vehicular distance acquired by the preceding vehicle information acquisition unit satisfies a preset start condition, is shorter than a start permission period that is set in advance;
    a starting request frequency detection unit that detects a number of times that the starting request has been detected after the host vehicle is stopped; and
    a start permission period setting unit that increases a length of the start permission period according to the number of times of the starting requests detected by the starting request frequency detection unit increases.

2. The starting control device as recited in claim 1, wherein
    the starting request frequency detection unit determines whether or not a starting request is the first starting request or a second or subsequent starting request, and
    the start permission period setting unit changes the start permission period depending on whether the starting request is a first starting request or a second or subsequent starting request.

3. The starting control device as recited in claim 2, wherein
    the starting request detection unit outputs a starting request detection signal upon detecting the starting request, the start permission period setting unit outputs a start suppression signal for suppressing the starting of the host vehicle when the start permission period has elapsed, and the starting request frequency detection unit determines that the starting request is the first starting request if only the starting request detection signal is being output, and determines that the starting request is the second or subsequent starting request if both the starting request detection signal and the start suppression signal are being outputted.

4. The starting control device as recited in claim 1, wherein the starting request frequency detection unit counts a number of times of the starting requests, and the start permission period setting unit changes the start permission period as a counted number of times of the starting requests increases.

5. The starting control device as recited in claim 1, wherein the starting request detection unit detects an interval at which a driver of the host vehicle inputs the starting requests, and the start permission period setting unit changes the start permission period according to the interval at which the starting requests are inputted.

6. A starting control method to start a host vehicle following a preceding vehicle that is stopped in front of the host vehicle using a starting control device, the starting control method comprising:

detecting the preceding vehicle is stopped in the front of the host vehicle;

acquiring an inter-vehicular distance and a relative speed between the host vehicle and the preceding vehicle that is detected;

detecting a starting request that is input by a driver of the host vehicle;

causing the host vehicle to start following a preceding vehicle when a standby period, which is the period from when the starting request is detected to when at least one of the relative speed and the inter-vehicular distance satisfies a preset start condition, is shorter than a start permission period that is set in advance;

detecting a number of times that the starting request has been detected after the host vehicle has stopped; and increasing a length of the start permission period as the number of times of the starting requests has been detected increases.

* * * * *